United States Patent
Mihan et al.

(10) Patent No.: US 6,858,071 B2
(45) Date of Patent: *Feb. 22, 2005

(54) SOLVENT-CONTAINING PASTES CONTAINING IN ADDITION POLYOLEFIN WAX

(75) Inventors: Shahram Mihan, Ludwigshafen (DE); Andreas Deckers, Flomborn (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 1 day.

This patent is subject to a terminal disclaimer.

(21) Appl. No.: 10/311,373

(22) PCT Filed: Jun. 15, 2001

(86) PCT No.: PCT/EP01/06825

§ 371 (c)(1), (2), (4) Date: Dec. 16, 2002

(87) PCT Pub. No.: WO01/98379

PCT Pub. Date: Dec. 27, 2001

(65) Prior Publication Data

US 2004/0007158 A1 Jan. 15, 2004

(30) Foreign Application Priority Data

Jun. 20, 2000 (DE) .................................. 200 29 329 U

(51) Int. Cl.$^7$ .............................................. C08L 91/06
(52) U.S. Cl. ..................................... 106/270; 106/271
(58) Field of Search ................................ 106/270, 271; 585/10; 526/160, 161, 169, 169.1, 169.2, 172; 502/103; 503/103

(56) References Cited

U.S. PATENT DOCUMENTS

| | | | |
|---|---|---|---|
| 6,080,902 A | * 6/2000 | Herrmann et al. | 585/512 |
| 6,107,530 A | 8/2000 | Hohner et al. | 585/9 |
| 6,143,846 A | * 11/2000 | Herrmann et al. | 526/170 |
| 6,166,161 A | * 12/2000 | Mullins et al. | 526/346 |
| 6,407,189 B1 | * 6/2002 | Herrmann | 526/160 |
| 6,506,856 B2 | * 1/2003 | Manders et al. | 526/91 |
| 2003/0019400 A1 | * 1/2003 | Deckers et al. | 106/502 |
| 2003/0114603 A1 | * 6/2003 | Mihan et al. | 525/333.8 |
| 2004/0035321 A1 | * 2/2004 | Mihan et al. | 106/31.29 |

FOREIGN PATENT DOCUMENTS

| | | |
|---|---|---|
| CA | 2103694 | 2/1994 |
| GB | 1056175 | 1/1967 |
| JP | 10/231317 | * 9/1998 |
| JP | 2001003723 | 6/1999 |
| WO | WO 00/34211 | 6/2000 |
| WO | WO 00/58319 | 10/2000 |
| WO | WO 00/58369 | 10/2000 |
| WO | WO 01/62806 | 2/2001 |
| WO | WO 01/98377 | * 12/2001 |
| WO | WO 01/98415 | * 12/2001 |
| WO | WO 01/98416 | * 12/2001 |

OTHER PUBLICATIONS

Kohn et al. "Selective Trimerization of α–Olefins with Triazacyclohexane Complexes of Chromium as Catalysts" Angew. Chem. Int. Ed. vol. 39, No. 23 (2000) pp. 4337–4339, no month available.

Kohn et al. "Triazacyclohexane complexes of chromium as highly active homogeneous model systems for Phillips catalyst" Chem. Commun. pp. 1927–1928, Aug. 2000.

Tani et al. "Preparation of Alph–olefin polymers by the use of vanadium or chromium complex catalysts" Stn Caplus vol. 129, No. 18 (1998), no month.

Ullmann' Encyclopädie der technischen Chemie, 4$^{th}$ Edition vol. 24 (1977) pp. 1–19.

Ullmann's Encylopädie dertechnischen Chemie, 5$^{th}$ Edition vol. A 28 (1996) pp. 108–163.

* cited by examiner

*Primary Examiner*—Helene Klemanski
(74) *Attorney, Agent, or Firm*—Keil & Weinkauf

(57) ABSTRACT

Solvent-containing pastes comprising a polyolefin wax component prepared from one or more olefins by catalysis using a single-site catalyst based on a complex of a transition metal from groups 5 to 8 of the Periodic System of the Elements, and use of these pastes.

8 Claims, No Drawings

SOLVENT-CONTAINING PASTES CONTAINING IN ADDITION POLYOLEFIN WAX

The present invention relates to solvent-containing pastes comprising a polyolefin wax component prepared from one or more olefins by catalysis using a single-site catalyst based on a tri-pnicogen-cyclohexane complex of a transition metal from groups 5 to 8 of the Periodic System of the Elements. The present invention further relates to a process for preparing the solvent-containing pastes of the invention, to methods of caring for surfaces such as floors or wallcoverings comprising wood, ceramic, linoleum or modern plastics such as PVC, for coated metal surfaces such as exteriors of motor vehicles or boats, or of leather, e.g., shoes, boots, saddles or leather bags/suitcases, using the solvent-containing pastes of the invention.

Pastes containing solvent are used on a large scale to care for different kinds of surfaces, examples being floors, autos, or leather goods such as shoes. They comprise at least one wax, one or more solvents, and, optionally, additives. For care, the paste is applied to the surface to be treated, after which the solvent evaporates and leaves the wax as a fine film, which is occasionally referred to below as the protective coating. This film protects the surface thus treated both mechanically, for example, and against the action of the air.

Important properties for the user of the solvent-containing pastes are the paste hardness, a measure of the paste consistency, and also the surface quality, gloss, heat stability, and duration of drying. The duration of drying generally depends greatly on the nature and amount of the solvent. The desire is normally for a very low solvent content while retaining good processing properties, e.g., low paste viscosity.

Pastes containing solvent usually comprise two or more components. As the first component, use is made of the polyolefin waxes. However, further natural and synthetic waxes are usually added to the pastes. Examples of natural waxes are the carnauba waxes, imported from Brazil, and also montan wax raffinates, paraffin waxes or microwaxes. One known additive comprises metal stearates. An overview is given, for example, in Ullmann's Enyclopädie der technischen Chemie, 5th edition, Vol. A 28, p. 108 ff., Weinheim, 1996.

Solvents used include hydrocarbons or hydrocarbon mixtures such as petroleum spirits or turpentine oil, for example.

Of decisive importance is the choice of the polyolefin waxes, which are usually used in amounts of from 10 to 15% by weight, based on the overall amount of paste.

The most suitable waxes are polyolefin waxes. These may be obtained, for example, by free-radical polymerization of ethylene by the high pressure process (cf. Ullmann's Enyclopädie der technischen Chemie, 4th edition, entry: Waxes, Vol. 24, p. 35 ff., Thieme Verlag Stuttgart, 1977) or by Ziegler-Natta polymerization of ethylene or propylene (DE-A 15 20 914, EP-A 0 584 586). These methods allow polyolefin waxes to be obtained having a broad molecular weight distribution and irregular incorporation of comonomers. The low molecular mass fractions which are present in these products lead in most cases to reduced hardness of the finished protective coatings.

EP-A 916 700 discloses the use of waxes, preferably polyethylene waxes obtained by metallocene catalysis are known to have a narrow molecular weight distribution and therefore contain very low fractions of low molecular mass polyolefin chains which normally impair the mechanical properties of the waxes. Accordingly, polyolefin waxes obtainable by metallocene cataysis give rise to improved hardness of the protective coatings produced with them, comprising the solvent-containing pastes described. However, a further improvement is desirable for the application. For instance, it is observed that even at relatively low concentrations of the wax for application, the solvent-containing pastes have a greatly increased viscosity. This increased viscosity makes it more difficult to apply the solvent-containing pastes uniformly to the surfaces to protected, of leather or autos, or else floors, for example. The simplest way of remedying this deficiency is to choose a lower wax concentration and thus a higher solvent fraction in the solvent-containing pastes. However, the customer does not desire high solvent concentrations, since they prolong the duration of drying and since the customer is required to process a greater fraction of the solvent—which as far as the customer is concerned is worthless.

It is an object of the present invention to provide solvent-containing pastes from which it is possible to produce protective coatings having good paste hardness but which are easier to process owing to a lower viscosity. A further object was to provide a process for preparing such solvent-containing pastes, and finally to provide a method of caring for surfaces such as floors or wallcoverings comprising wood, ceramic, linoleum or modern plastics such as PVC, for coated metal surfaces such as exteriors of motor vehicles or boats, or for leather, e.g., shoes, boots, saddles or leather bags/suitcases, using such solvent-containing pastes.

We have found that this object is achieved by virtue of the fact that polyolefin waxes prepared from one or more olefins by catalysis using a single site catalyst based on a tri-pnicogen-cyclohexane complex of a transition metal from groups 5 to 8 of the Periodic System are especially suitable additives for the aforementioned area of application. The tri-pnicogen-cyclohexane complexes are preferably selected from 1,3,5-triazacyclohexane complexes, 1,3,5-triphosphacyclohexane complexes and 1,3-diaza-5-phosphacyclohexane complexes of a transition metal from groups 5 to 8 of the Periodic System of the Elements. Particularly preferred polyolefin waxes are those prepared with the aid of a complex of the formula I.

In formula I the variables are defined as follows:

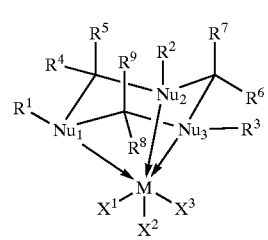

I

M is an element from the group consisting of V, Nb, Ta, Cr, Mo, W, Mn, Fe in oxidation state +3; preferably V, Cr or Mo, and with particular preference Cr;

$Nu^1$ to $Nu^3$ are selected independently of one another from the pnicogens, preferably N or P; preferably, $Nu^1$ and $Nu^2$ are each N and with particular preference $Nu^1$ to $Nu^3$ are each N.

$X^1$ to $X^3$ are selected from halogen such as fluorine, chlorine, bromine or iodine, chlorine and bromine being particularly preferred;

trifluoroacetate, $BF_4-$, $PF_6-$ or $SbF_6-$, $C_1-C_{18}$ alkyl such as methyl, ethyl, n-propyl, iso-propyl, n-butyl, iso-butyl, sec-butyl, tert-butyl, n-pentyl, iso-pentyl, sec-pentyl, neo-pentyl, 1,2-dimethylpropyl, iso-amyl, n-hexyl, iso-hexyl, sec-hexyl, n-heptyl, iso-heptyl, n-octyl, n-nonyl, n-decyl, and n-dodecyl; preferably $C_1$–$C_6$ alkyl such as methyl, ethyl, n-propyl, iso-propyl, n-butyl, iso-butyl, sec-butyl, tert-butyl, n-pentyl, iso-pentyl, sec-pentyl, neo-pentyl, 1,2-dimethylpropyl, iso-amyl, n-hexyl, iso-hexyl, sec-hexyl, with particular preference $C_1$–$C_4$ alkyl such as methyl, ethyl, n-propyl and n-butyl;

$C_3$–$C_{12}$ cycloalkyl such as cyclopropyl, cyclobutyl, cyclopentyl, cyclohexyl, cycloheptyl, cyclooctyl, cyclononyl, cyclodecyl, cycloundecyl and cyclododecyl; cyclopentyl, cyclohexyl and cycloheptyl are preferred, $C_7$ to $C_{20}$ aralkyl, preferably $C_7$ to $C_{12}$ phenylalkyl such as benzyl, 1-phenethyl, 2-phenethyl, 1-phenylpropyl, 2-phenylpropyl, 3-phenylpropyl, 1-phenylbutyl, 2-phenylbutyl, 3-phenylbutyl and 4-phenylbutyl, with particular preference benzyl, $C_6$–$C_{14}$ aryl such as phenyl, 1-naphthyl, 2-naphthyl, 1-anthryl, 2-anthryl, 9-anthryl, 1-phenanthryl, 2-phenanthryl, 3-phenanthryl, 4-phenanthryl and 9-phenanthryl, preferably phenyl, 1-naphthyl and 2-naphthyl, with particular preference phenyl;

$C_1$–$C_{12}$ alkoxy, preferably $C_1$–$C_6$ alkoxy such as methoxy, ethoxy, n-propoxy, iso-propoxy, n-butoxy, iso-butoxy, sec-butoxy, tert-butoxy, n-pentoxy, iso-pentoxy, n-hexoxy and iso-hexoxy, with particular preference methoxy, ethoxy, n-propoxy and n-butoxy, or $NR^{10}R^{11}$, where $R^{10}$ and $R^{11}$ independently of one another are selected from hydrogen, $C_1$–$C_{12}$ alkyl, $C_2$–$C_{12}$ alkenyl and $C_6$–$C_{14}$ aryl, which are able to form a saturated or unsaturated 5- to 10-membered ring; preference is given to the dimethylamino, the diethylamino, the diisopropylamino, the methylphenylamino and the diphenylamino groups. Examples of amino groups containing saturated rings are the N-piperidyl group and the N-pyrrolidinyl group; examples of amino groups containing unsaturated rings are the N-pyrryl group, the N-indolyl group and the N-carbazolyl group.

Preferably, $X^1$ to $X^3$ are identical; with very particular preference, $X^1$ to $X^3$ are chlorine.

$R^1$ to $R^3$ independently of one another are $C_1$–$C_{18}$ alkyl such as methyl, ethyl, n-propyl, iso-propyl, n-butyl, iso-butyl, sec-butyl, tert-butyl, n-pentyl, iso-pentyl, sec-pentyl, neo-pentyl, 1,2-dimethylpropyl, iso-amyl, n-hexyl, iso-hexyl, sec-hexyl, n-heptyl, iso-heptyl, n-octyl, n-nonyl, n-Decyl, and n-dodecyl; preferably $C_1$–$C_6$ alkyl such as methyl, ethyl, n-propyl, iso-propyl, n-butyl, iso-butyl, sec-butyl, tert-butyl, n-pentyl, iso-pentyl, sec-pentyl, neo-pentyl, 1,2-dimethylpropyl, iso-amyl, n-hexyl, iso-hexyl, sec-hexyl, with particular preference $C_1$–$C_4$ alkyl such as methyl, ethyl, n-propyl, iso-propyl, n-butyl, iso-butyl, sec-butyl and tert-butyl, $C_1$–$C_{12}$ alkyl substituted one or more times by donor atoms, examples being noncyclic or cyclic ethers, alcohols, ketals, thioethers or amines; specific examples are methoxymethyl, ethoxymethyl, ethoxyethyl, β-hydroxyethyl, ω-ethoxypropyl, (2-ethylhexyloxy)propylidene, methoxyethoxypropylidene or ω-dimethylaminopropyl;

mono- or polyhalogenated $C_1$–$C_{12}$ alkyl groups such as fluoromethyl, difluoromethyl, trifluoromethyl, chloromethyl, dichloromethyl, trichloromethyl, bromomethyl, dibromomethyl, tribromomethyl, pentafluoroethyl, perfluoropropyl and perfluorobutyl, particular preference being given to fluoromethyl, difluoromethyl, trifluoromethyl and perfluorobutyl;

$C_2$–$C_{12}$ alkenyl, preferably $C_2$ to ω-$C_8$ alkenyl such as vinyl, allyl, but-3-en-1-yl, ω-pentenyl, ω-hexenyl, ω-heptenyl, and ω-octenyl;

$C_3$–$C_{12}$ cycloalkyl such as cyclopropyl, cyclobutyl, cyclopentyl, cyclohexyl, cycloheptyl, cyclooctyl, cyclononyl, cyclodecyl, cycloundecyl and cyclododecyl; preference is given to cyclopentyl, cyclohexyl and cycloheptyl;

$C_7$ to $C_{20}$ aralkyl, preferably $C_7$ to $C_{12}$ phenylalkyl such as benzyl, 1-phenethyl, 2-phenethyl, 1-phenylpropyl, 2-phenylpropyl, 3-phenylpropyl, 1-phenylbutyl, 2-phenylbutyl, 3-phenylbutyl and 4-phenylbutyl, with particular preference benzyl, $C_6$–$C_{14}$ aryl such as phenyl, 1-naphthyl, 2-naphthyl, 1-anthryl, 2-anthryl, 9-anthryl, 1-phenanthryl, 2-phenanthryl, 3-phenanthryl, 4-phenanthryl and 9-phenanthryl, preferably phenyl, 1-naphthyl and 2-naphthyl, with particular preference phenyl, silyl $SiR^{12}R^{13}R^{14}$, where $R^{12}$ to $R^{14}$ independently of one another are selected from hydrogen, $C_1$–$C_{12}$ alkyl, $C_7$–$C_{15}$ aralkyl and $C_6$–$C_{14}$ aryl; preference is given to the trimethylsilyl, triethylsilyl, triisopropylsilyl, diethylisopropylsilyl, dimethylhexylsilyl, tert-butyldimethylsilyl, tert-butyldiphenylsilyl, tribenzylsilyl, triphenylsilyl and the tri-para-xylylsilyl groups; particular preference is given to the trimethylsilyl group and the tert-butyldimethylsilyl group;

siloxy $OSiR^{12}R^{13}R^{14}$, where $R^{12}$ to $R^{14}$ are selected independently of one another from hydrogen, $C_1$–$C_{12}$ alkyl, $C_7$–$C_{15}$ aralkyl and $C_6$–$C_{14}$ aryl; preference is given to the trimethylsilyloxy, triethylsilyloxy, triisopropylsilyloxy, diethylisopropylsilyloxy, dimethylthexylsilyloxy, tert-butyldimethylsilyloxy, tert-butyldiphenylsilyloxy, tribenzylsilyloxy, triphenylsilyloxy and the tri-para-xylylsilyloxy groups; particular preference is given to the trimethylsilyloxy group and the tert-butyldimethylsilyloxy group;

$C_1$–$C_{12}$ alkoxy, preferably $C_1$–$C_6$ alkoxy such as methoxy, ethoxy, n-propoxy, iso-propoxy, n-butoxy, iso-butoxy, sec-butoxy, tert-butoxy, n-pentoxy, iso-pentoxy, n-hexoxy and iso-hexoxy, with particular preference methoxy, ethoxy, n-propoxy and n-butoxy;

$C_6$–$C_{14}$ aryl substituted in turn by one or more $C_1$–$C_{12}$ alkyl, $C_1$–$C_{12}$ alkenyl, $C_3$–$C_{12}$ cycloalkyl, $C_6$–$C_{14}$ aryl, silyl $SiR^{12}R^{13}R^{14}$, siloxy $OSiR^{12}R^{13}R^{14}$ or $C_1$–$C_{12}$ alkoxy groups specified as above;

$R^4$ to $R^9$ independently of one another are hydrogen, halogen such as fluorine, chlorine, bromine or iodine, preference being given to chlorine and bromine;

$C_1$–$C_{18}$ alkyl such as methyl, ethyl, n-propyl, iso-propyl, n-butyl, iso-butyl, sec-butyl, tert-butyl, n-pentyl, iso-pentyl, sec-pentyl, neo-pentyl, 1,2-dimethylpropyl, iso-amyl, n-hexyl, iso-hexyl, sec-hexyl, n-heptyl, iso-heptyl, n-octyl, n-nonyl, n-decyl, and n-dodecyl; preferably $C_1$–$C_6$ alkyl such as methyl, ethyl, n-propyl, iso-propyl, n-butyl, iso-butyl, sec-butyl, tert-butyl, n-pentyl, iso-pentyl, sec-pentyl, neo-pentyl, 1,2-dimethylpropyl, iso-amyl, n-hexyl, iso-hexyl, sec-hexyl, with particular preference $C_1$–$C_4$ alkyl such as methyl, ethyl, n-propyl, iso-propyl, n-butyl, iso-butyl, sec-butyl and tert-butyl, $C_1$–$C_{12}$ alkyl substituted one or more times by donor atoms, examples being noncyclic or cyclic ethers, alcohols, ketals, thioethers or amines; specific examples are methoxymethyl, ethoxymethyl, ethoxyethyl, β-hydroxyethyl, ω-ethoxypropyl, (2-ethylhexyloxy)propylidene, methoxyethoxypropylidene or ω-dimethylaminopropyl;

mono- or polyhalogenated $C_1$–$C_{12}$ alkyl groups such as fluoromethyl, difluoromethyl, trifluoromethyl, chloromethyl, dichloromethyl, trichloromethyl, bromomethyl, dibromomethyl, tribromomethyl, pentafluoroethyl, perfluoropropyl and perfluorobutyl, particular preference being given to fluoromethyl, difluoromethyl, trifluoromethyl and perfluorobutyl;

$C_2$–$C_{12}$ alkenyl, preferably $C_2$ to ω-$C_8$ alkenyl such as vinyl, allyl, but-3-en-1-yl, ω-pentenyl, ω-hexenyl, ω-heptenyl, and ω-octenyl;

$C_3$–$C_{12}$ cycloalkyl such as cyclopropyl, cyclobutyl, cyclopentyl, cyclohexyl, cycloheptyl, cyclooctyl, cyclononyl, cyclodecyl, cycloundecyl and cyclododecyl; preference is given to cyclopentyl, cyclohexyl and cycloheptyl;

$C_7$ to $C_{20}$ aralkyl, preferably $C_7$ to $C_{12}$ phenylalkyl such as benzyl, 1-phenethyl, 2-phenethyl, 1-phenylpropyl, 2-phenylpropyl, 3-phenylpropyl, 1-phenylbutyl, 2-phenylbutyl, 3-phenylbutyl and 4-phenylbutyl, with particular preference benzyl, $C_6$–$C_{14}$ aryl such as phenyl, 1-naphthyl, 2-naphthyl, 1-anthryl, 2-anthryl, 9-anthryl, 1-phenanthryl, 2-phenanthryl, 3-phenanthryl, 4-phenanthryl and 9-phenanthryl, preferably phenyl, 1-naphthyl and 2-naphthyl, with particular preference phenyl, silyloxy $SiR^{12}R^{13}R^{14}$, where $R^{12}$ to $R^{14}$ independently of one another are selected from hydrogen, $C_1$–$C_{12}$ alkyl, $C_7$–$C_{15}$ aralkyl and $C_6$–$C_{14}$ aryl; preference is given to the trimethylsilyl, triethylsilyl, triisopropylsilyl, diethylisopropylsilyl, dimethylhexylsilyl, tert-butyldimethylsilyl, tert-butyldiphenylsilyl, tribenzylsilyl, triphenylsilyl and the tri-para-xylylsilyl groups; particular preference is given to the trimethylsilyl group and the tert-butyldimethylsilyl group;

silyloxy $OSiR^{12}R^{13}R^{14}$, where $R^{12}$ to $R^{14}$ are selected independently of one another from hydrogen, $C_1$–$C_{12}$ alkyl, $C_7$–$C_{15}$ aralkyl and $C_6$–$C_{14}$ aryl; preference is given to the trimethylsilyloxy, triethylsilyloxy, triisopropylsilyloxy, diethylisopropylsilyloxy, dimethylhexylsilyloxy, tert-butyldimethylsilyloxy, tert-butyldiphenylsilyloxy, tribenzylsilyloxy, triphenylsilyloxy and the tri-para-xylylsilyloxy groups; particular preference is given to the trimethylsilyloxy group and the tert-butyldimethylsilyloxy group;

$C_1$–$C_{12}$ alkoxy, preferably $C_1$–$C_6$ alkoxy such as methoxy, ethoxy, n-propoxy, iso-propoxy, n-butoxy, iso-butoxy, sec-butoxy, tert-butoxy, n-pentoxy, iso-pentoxy, n-hexoxy and iso-hexoxy, with particular preference methoxy, ethoxy, n-propoxy and n-butoxy;

$C_6$–$C_{14}$ aryl substituted in turn by one or more $C_1$–$C_{12}$ alkyl, $C_1$–$C_{12}$ alkenyl, $C_3$–$C_{12}$ cycloalkyl, $C_6$–$C_{14}$ aryl, silyl $SiR^{12}R^{13}R^{14}$, siloxy $OSiR^{12}R^{11}R^{12}$ or $C_1$–$C_{12}$ alkoxy groups specified as above.

Preferably, the radicals $R^1$ to $R^3$ are each identical. Preferably $R^4$, $R^6$ and $R^8$ are each identical, and preferably $R^4$, $R^6$ and $R^8$ are each hydrogen. With very particular preference, $R^4$ to $R^9$ are hydrogen. The triazacyclohexane ligands necessary for synthesizing these very particularly preferred compounds may be synthesized with particular ease.

In one particular embodiment of the formula I, two adjacent radicals together form a saturated or unsaturated 4- to 9-membered ring; for example, two radicals may together be: $C_3$–$C_9$ alkylidene such as, for example, —$(CH_2)_3$— (trimethylene), —$(CH_2)_4$— (tetramethylene), —$(CH_2)_5$— (pentamethylene), —$(CH_2)_6$— (hexamethylene), —$CH_2$—CH=CH—, —$CH_2$—CH=CH—$CH_2$—, —CH=CH—CH=CH—; and also cyclic aldols, ketals or amines such as, for example, —O—$CH_2$—O—, —O—$CH(CH_3)$—O—, —O—CH—$(C_6H_5)$—O—, —O—$CH_2$—$CH_2$—O—, —O—$C(CH_3)_2$—O—, —$N(CH_3)$—$CH_2$—$CH_2$—$N(CH_3)$—, —$N(CH_3)$—$CH_2$—$N(CH_3)$— or —O—$Si(CH_3)_2$—O—.

The preparation of the particularly preferred triazacycloalkane ligands for complexes of the formula I is known per se. Those for the synthesis of the very particularly preferred compounds of the formula I where $R^4$ to $R^9$ are each hydrogen and the radicals $R^1$ to $R^3$ are each identical may be synthesized very effectively by mixing formaldehyde in the form, for example, of formalin solution with the associated amine $R^{14}$—$NH_2$. Various synthesis pathways for these complex ligands are described, for example, in F. Weitl et al., *J. Am. Chem. Soc.* 1979, 101 2728; M. Takahashi, S. Takamoto, *Bull. Chem. Soc.* Japan 1977, 50, 3413; T. Arishima et al., *Nippon Kagaku Kaishi* 1973, 1119; L. Christiansen et al. *Inorg. Chem.* 1986, 25, 2813; L. R. Gahan et al., *Aust. J. Chem.* 1982, 35, 1119; B. A. Sayer et al., *Inorg. Chim.* Acta, 1983, 77, L63; K Wieghardt et al., *Z. Naturforsch.*, 1983, 38b, 81 and I. A. Fallis et al., *J. Chem. Soc., Chem. Commun.* 1998, 665. Where one or two nitrogen atoms are to be replaced by P, the corresponding phosphines are reacted with formalin solution.

The metal complexes, especially the chromium complexes, may be obtained in a simple manner by reacting the corresponding metal salts such as metal chlorides or metal carbonyls, for example, with the ligand, as for example in P. Chaudhuri, K. Wieghardt, *Prog. Inorg. Chem.* 1987, 35, 329 or G. P. Stahley et al., *Acta Crystall.* 1995, C51, 18.

In order that above complexes of the formulae I are catalytically active, they are activated with a cation-forming compound. Suitable cation-forming compounds are selected aluminum or boron compounds having electron withdrawing radicals (e.g. trispentafluorophenylborane, trispentafluorophenylaluminum, N,N-dimethylanilinium tetrakispentafluorophenylborate, tri-n-butylammonium tetrakispentafluorophenylborate, N,N-dimethylanilinium tetrakis(3,5-bisperfluoromethyl)phenylborate, tri-n-butylammonium tetrakis(3,5-bisperfluoromethyl) phenylborate, and tritylium tetrakispentafluorophenylborate). These activators for complexes of the formulae I are described in DE-A 199 35 407, in PCT/EP 0002716, and in Angew. Chem. Int. Ed., 1994, Vol. 33, p. 1877. Preference is given to dimethylanilinium tetrakispentafluorophenylborate, tritylium tetrakispentafluorophenylborate, and trispentafluorophenylborane.

Another suitable class of cation-forming compounds comprises the aluminoxanes of the formulae II a and b.

The structure of the aluminoxanes is not precisely known. They are products obtained by careful partial hydrolysis of aluminum alkyls (see DE-A 30 07 725). These products do not exist in pure form but are instead mixtures of open-chain and cyclic structures of type II a and b. These mixtures are presumed to exist in a dynamic equilibrium with one another.

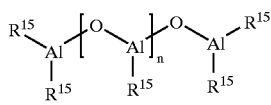

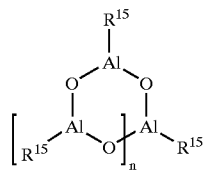

In formulae II a and b, the radicals $R^{15}$ independently of one another are $C_1$–$C_{12}$ alkyl such as methyl, ethyl, n-propyl, iso-propyl, n-butyl, iso-butyl, sec-butyl, tert-butyl, n-pentyl, iso-pentyl, sec-pentyl, neo-pentyl, 1,2-dimethylpropyl, iso-amyl, n-hexyl, iso-hexyl, sec-hexyl, n-heptyl, iso-heptyl, n-octyl, n-nonyl, n-decyl, and n-dodecyl; preferably $C_1$–$C_6$ alkyl such as methyl, ethyl, n-propyl, iso-propyl, n-butyl, iso-butyl, sec-butyl, tert-butyl, n-pentyl, iso-pentyl, sec-pentyl, neo-pentyl, 1,2-dimethylpropyl, iso-amyl, n-hexyl, iso-hexyl, sec-hexyl; methyl is particularly preferred;

$C_3$–$C_{12}$ cycloalkyl such as cyclopropyl, cyclobutyl, cyclopentyl, cyclohexyl, cycloheptyl, cyclooctyl, cyclononyl, cyclodecyl, cycloundecyl and cyclododecyl; preference is given to cyclopentyl, cyclohexyl and cycloheptyl;

$C_7$ to $C_{20}$ aralkyl, preferably $C_7$ to $C_{12}$ phenylalkyl such as benzyl, 1-phenethyl, 2-phenethyl, 1-phenylpropyl, 2-phenylpropyl, 3-phenylpropyl, 1-phenylbutyl, 2-phenylbutyl, 3-phenylbutyl and 4-phenylbutyl, with particular preference benzyl, or $C_6$–$C_{14}$ aryl such as phenyl, 1-naphthyl, 2-naphthyl, 1-anthryl, 2-anthryl, 9-anthryl, 1-phenanthryl, 2-phenanthryl, 3-phenanthryl, 4-phenanthryl and 9-phenanthryl, preferably phenyl, 1-naphthyl and 2-naphthyl, with particular preference phenyl; and n is an integer from 0 to 40, preferably from 1 to 25, and with particular preference from 2 to 22.

In the literature, cagelike structures are also discussed for aluminoxanes (Y. Koide, S. G. Bott, A. R. Barron *Organometallics* 1996, 15, 2213–26; A. R. Barron *Macromol. Symp.* 1995, 97, 15–25). Irrespective of the actual structure of the aluminoxanes, they are suitable activators for complexes of transition metals of the formulae I.

Mixtures of different aluminoxanes are particularly preferred activators in those cases where polymerization is conducted in a solution of a paraffin, n-heptane or isododecane, for example. One particularly preferred mixture is the COMAO available commercially from Witco GmbH, having a formula of $[(CH_3)_{0.9}(iso\text{-}C_4H_9)_{0.1}AlO]_n$.

The chosen complex of the formulae I and the cation-forming compound together form a catalyst system. By adding one or more further aluminum alkyl compounds of the formula $Al(R^{15})_3$ it is possible to increase further the activity of this catalyst system.

Aluminum alkyls of the formula $Al(R^{15})_3$ or aluminoxanes may also act as molecular mass regulators. Another effective molecular mass regulator is hydrogen. The molecular mass may be regulated with particular effect by the reaction temperature and the residence time.

Modern large-scale industrial preparation processes for polyolefin waxes are solution processes, suspension processes, bulk polymerization processes in liquid or supercritical monomer, and gas phase processes, the latter being either stirred gas phase or gas-phase fluidized bed processes.

In order that the complexes of the formulae I may be used in suspension processes, bulk polymerization processes or gas phase processes, it is advantageous to immobilize them on a solid support. Otherwise, morphological problems of the polymer (crumbs, wall deposits, blockages in pipes or heat exchangers) may occur, forcing shutdown of the plant.

Catalyst systems comprising complexes of the formulae I and activator may be effectively deposited on a solid support. Examples of suitable support materials are porous metal oxides, of metals from groups 2 to 14 or mixtures thereof, and also sheet silicates, and also solid halides of metals from groups 1, 2 and 13, and polymers such as, for example, polyethylene or polypropylene. Preferred examples of metal oxides from groups 2 to 14 are $SiO_2$, $B_2O_3$, $Al_2O_3$, MgO, CaO and ZnO. Preferred sheet silicates are montmorillonites or bentonites; preferred halides are $MgCl_2$ or amorphous $AlF_3$.

Particularly preferred support materials are spherical silica gels and alumosilicate gels of the formula $SiO_2$a $Al_2O_3$, where a is generally a number in the range from 0 to 2, preferably from 0 to 0.5. Silica gels of this kind are available commercially, e.g., Silica Gel 332, Sylopol® 948 or Sylopol 952 or S 2101 from W. R. Grace or ES 70X from Crosfield.

Proven particle sizes for the support material comprise average particle diameters of from 1 to 300 µm, preferably from 20 to 80 µm, the particle diameter being determined by means of known methods such as sieve methods. The pore volume of these supports is from 1.0 to 3.0 ml/g, preferably from 1.6 to 2.2 ml/g, and with particular preference from 1.7 to 1.9 ml/g. The BET surface area is from 200 to 750 m$^2$/g, preferably from 250 to 400 m$^2$/g.

In order to remove impurities, especially moisture, adhering to the support material, the support materials may be heated out prior to doping, suitable temperatures being from 45 to 1000° C. Temperatures of from 100 to 750° C. are particularly suitable for silica gels and other metal oxides; for $MgCl_2$ supports, temperature ranges from 50 to 100° C. are preferred. This heating out should take place over a period of from 0.5 to 24 hours, heatout times of from 1 to 12 hours being preferred. The pressure conditions are not critical per se; heating out may take place under atmospheric pressure. Advantageously, however, use is made of reduced pressures of from 0.1 to 500 mbar; a particularly advantageous range is from 1 to 100 mbar and a very particularly advantageous range from 2 to 20 mbar. Chemical pretreatment of the support material is another possibility.

The general procedure for doping the catalyst is to slurry the support material in a suspension medium and to combine this suspension with the solution of a complex of the formula I and of the activator. The volume of the suspension medium is from 1 to 20 times the pore volume of the catalyst support. Subsequently, the catalyst may be separated from the suspension medium by means of an appropriate method, such as filtration, centrifugation or evaporation.

For better control of the morphology, the catalyst may be prepolymerized with small amounts of monomer prior to the polymerization proper. The prepolymerization can be terminated by adding a reversible catalyst poison or by ending the feed of monomer, and the prepolymerized catalyst may subsequently be added to the polymerization unit.

Suitable monomers include the following olefins: ethylene, propylene, 1-butene, 1-pentene, 1-hexene, 1-octene, 1-decene or 1-undecene, ethylene being particularly preferred.

Suitable comonomers include α-olefins, such as from 0.1 to 20 mol % of 1-butene, 1-pentene, 1-hexene, 4-methyl-1-pentene, 1-octene, 1-decene or 1-undecene. Isobutene, however, is also a suitable comonomer.

In order to prevent the electrostatic charging of the polymerization unit or of the product that is occasionally observed with polymerizations, an antistat may be added to the reaction mixture. Suitable antistats are dilute solutions of aliphatic alcohols, such as isopropanol, in paraffins such as n-heptane, for example. Further suitable antistats are available commercially as Stadis® products from DuPont.

To prepare the solvent-containing pastes of the invention, an advantageous procedure is to melt the polyolefin wax and then to add preheated solvent. In this operation it is advantageous to effect thorough mixing of the hot paste, which can be achieved by stirring, shaking or similar operations known to the skilled worker. Solvents used are advantageously petroleum spiritis or turpentine oil.

As a quantitative proportion, more than 20 percent by weight, preferably more than 25% by weight and, with particular preference >30% of polyolefin wax is chosen. It is also possible to use less wax, although in that case the solvent-containing pastes have high solvent contents, which is undesirable.

Thereafter, further constituents are optionally added; examples are montan waxes, carnauba waxes, metal stearates, antioxidants such as the Irganox® products from Ciba for example, or paraffin waxes.

Subsequently, the mixture is left for a period of at least 1 minute and not more than one hour with stirring at a temperature just above the solidification point, and in the latter operation the mixture is cooled. The target temperature used is room temperature or colder, but not below −78° C. After 24 hours, the paste hardness is measured.

WORKING EXAMPLE

Preparation of the complex $(n-C_{12}H_{25}NCH_2)_3CrCl_3$ and polymerization of ethylene are described fundamentally in DE-A 199 35 407, in PCT/EP 0002716, and in Angew. Chem. Int. Ed., Vol. 33, 1994, p. 1877.

In a 10 liter steel autoclave (from Büchi), 50 mg (67 μmol) of $(n-C_{12}H_{25}NCH_2)_3CrCl_3$, dissolved in toluene, were activated with 14 ml of 30% MAO from Witco, the Al:Cr ratio set being 1000:1. 4 l of isobutane and 80 l (3.8 mol) of hydrogen were injected, and the autoclave was then heated to 90° C. Subsequently, 40 bar of ethylene were injected and polymerization was conducted for 30 minutes, the pressure being maintained at 40 bar by adding further ethylene.

The polymerization was terminated by letting down the autoclave.

Yield: 460 g, corresponding to an activity of 14,000 kg of PE(mol Cr·h).

The wax thus obtained had the following properties: melting point 128.5° C.; $M_w$: 5200 g, $M_n$: 2100 g. $M_w/M_n$= 2.5.

The application example was conducted in analogy to Examples 1 and 2 of EP 0 916 700, in order to ensure good comparability of the results:

20 parts by weight of wax were melted and brought to a temperature of 140° C. 100 parts by weight of petroleum spirit (boiling range 140–180° C.) were added with stirring. The wax solution was first brought to a temperature of 2° C. above the melting point of the wax and then poured into a can which had been cooled to 16° C. (bottom cooling). The solvent-containing paste thus obtained was stored at room temperature for 24 hours, after which the paste hardness was measured.

| Test | Wax | Melting point | Melt viscosity at 140° C. [cst] | Paste viscosity [mPa · s] | Paste hardness [mbar] |
|---|---|---|---|---|---|
| 1 | DE 199 35 407 | 125.3 | 670 | 370 | 450 |
| C1 | Ziegler-Natta[1] | 124.2 | 590 | 450 | 390 |
| C2 | EP 0 916 700 | 126.4 | 710 | 1310 | 210 |
| C3 | High pressure[2] | 111.3 | 690 | 1109 | 90 |

[1]Clariant-Wachs PE 520, available commercially from Clariant AG.
[2]Luwax® A, available commercially from BASF AG.

We claim:

1. A solvent-containing paste comprising a polyolefin wax component prepared from one or more olefins by catalysis using a single-site catalyst based on a tri-pnicogen-cyclohexane complex of a transition metal from groups 5 to 8 of the Periodic System of the Elements.

2. A solvent-containing paste as claimed in claim 1, wherein the tri-pnicogen-cyclohexane complex is selected from a group consisting of 1,3,5-triazacyclohexane complexes, 1,3,5-triphosphacyclohexane complexes and 1,3-diaza-5-phosphacyclohexane complexes of a transition metal from groups 5 to 8 of the Periodic System of the Elements.

3. A solvent-containing paste as claimed in claim 1, wherein the single-site catalyst comprises as catalytically active component a Cr complex.

4. A process for preparing a solvent-containing paste, which comprises dissolving in a hydrocarbon a polyolefin wax prepared from one or more olefins by catalysis using a single site catalyst based on a tri-pnicogen-cyclohexane complex of a transition metal from groups 5 to 8 of the Periodic System and then cooling the solution.

5. A method of caring for floors and wallcoverings comprising wood, ceramic, linoleum or plastics, which comprises treating said floors or wallcoverings with one or more solvent-containing pastes as claimed in any of claim 1.

6. A method of caring for metal surfaces of motor vehicles and boats, which comprises treating said metal surfaces with one or more solvent-containing pastes as claimed in claim 1.

7. A method of caring for leather, which comprises treating the leather goods with one or more solvent-containing pastes as claimed in claim 1.

8. The solvent-containing paste defined in claim 1, wherein the polyolefin wax is a polyethylene wax.

* * * * *

UNITED STATES PATENT AND TRADEMARK OFFICE
CERTIFICATE OF CORRECTION

PATENT NO. : 6,858,071 B2
APPLICATION NO. : 10/311373
DATED : February 22, 2005
INVENTOR(S) : Mihan et al.

It is certified that error appears in the above-identified patent and that said Letters Patent is hereby corrected as shown below:

Claim 5, column 10, line 51, delete "any of"

Signed and Sealed this

Twenty-fifth Day of July, 2006

JON W. DUDAS
*Director of the United States Patent and Trademark Office*